(12) United States Patent
Wu et al.

(10) Patent No.: US 11,314,950 B2
(45) Date of Patent: Apr. 26, 2022

(54) TEXT STYLE TRANSFER USING REINFORCEMENT LEARNING

(71) Applicants: INTERNATIONAL BUSINESS MACHINES CORPORATION, Armonk, NY (US); The Board of Trustees of the University of Illinois, Urbana, IL (US)

(72) Inventors: Lingfei Wu, Elmsford, NY (US); Jinjun Xiong, Goldens Bridge, NY (US); Hongyu Gong, Urbana, IL (US); Suma Bhat, Urbana, IL (US); Wen-Mei Hwu, Urbana, IL (US)

(73) Assignees: INTERNATIONAL BUSINESS MACHINES CORPORATION, Armonk, NY (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 156 days.

(21) Appl. No.: 16/830,106

(22) Filed: Mar. 25, 2020

(65) Prior Publication Data
US 2021/0303803 A1    Sep. 30, 2021

(51) Int. Cl.
*G06F 40/56* (2020.01)
*G06F 40/253* (2020.01)
*G06F 40/35* (2020.01)
*G06N 3/04* (2006.01)

(52) U.S. Cl.
CPC ............ *G06F 40/56* (2020.01); *G06F 40/253* (2020.01); *G06F 40/35* (2020.01); *G06N 3/049* (2013.01)

(58) Field of Classification Search
None
See application file for complete search history.

(56) References Cited

U.S. PATENT DOCUMENTS

| | | |
|---|---|---|
| 9,015,093 B1 | 4/2015 | Commons |
| 9,659,560 B2 | 5/2017 | Cao et al. |
| 9,672,814 B2 | 6/2017 | Cao et al. |
| 9,875,440 B1 | 1/2018 | Commons |

(Continued)

OTHER PUBLICATIONS

Mir, Remi, et al. "Evaluating style transfer for text." arXiv preprint arXiv:1904.02295 (2019). (Year: 2019).*

(Continued)

*Primary Examiner* — Douglas Godbold
(74) *Attorney, Agent, or Firm* — Tutunjian & Bitetto; Stosch Sabo

(57) ABSTRACT

A computer-implemented method is provided for transferring a target text style using Reinforcement Learning (RL). The method includes pre-determining, by a Long Short-Term Memory (LSTM) Neural Network (NN), the target text style of a target-style natural language sentence. The method further includes transforming, by a hardware processor using the LSTM NN, a source-style natural language sentence into the target-style natural language sentence that maintains the target text style of the target-style natural language sentence. The method also includes calculating an accuracy rating of a transformation of the source-style natural language sentence into the target-style natural language sentence based upon rewards relating to at least the target text style of the source-style natural language sentence.

19 Claims, 9 Drawing Sheets

(56) References Cited

U.S. PATENT DOCUMENTS

| | | | |
|---|---|---|---|
| 10,402,649 B2 | 9/2019 | Rabinovich et al. | |
| 2019/0188271 A1* | 6/2019 | Murdock | G06F 16/24578 |
| 2019/0303435 A1* | 10/2019 | Herr | G06F 40/45 |
| 2020/0356634 A1* | 11/2020 | Srinivasan | G06F 40/58 |
| 2021/0034813 A1* | 2/2021 | Wu | G06K 9/6267 |
| 2021/0117458 A1* | 4/2021 | Higashinaka | G06F 16/3329 |
| 2021/0124802 A1* | 4/2021 | Wang | G06F 40/30 |
| 2021/0182339 A1* | 6/2021 | Carrier | G06F 16/3344 |
| 2021/0209311 A1* | 7/2021 | Liu | G06F 40/237 |

OTHER PUBLICATIONS

Grace Period Disclosure: Gong et al., "Reinforcement Learning Based Text Style Transfer without Parallel Training Corpus", 2019 Conference of the North American Chapter of the Association for Computational Linguistics: Human Language Technologies Jun. 2019 (pp. 3168-3180).

Mell et al. "The NIST Definition of Cloud Computing", NIST Special Publication 800-145, 2011, 7 pages.

Li et al., "Delete, Retrieve, Generate: A Simple Approach to Sentiment and Style Transfer", arXiv:1804.06437v1 [cs.CL] Apr. 17, 2018., 12 pages.

Dos Santos et al., "Fighting Offensive Language on Social Media with Unsupervised Text Style Transfer", arXiv:1805.07685v1 [cs.CL] May 20, 2018, 6 pages.

Han et al., "Unsupervised Automatic Text Style Transfer using LSTM", Springer, Aug. 2018, 12 pages.

Zhang et al., "AI-Powered Text Generation for Harmonious Human-Machine Interaction: Current State and Future Directions", IEEE, May 2019, 8 pages.

Keneshloo et al., "Deep Reinforcement Learning for Sequence-to-Sequence Models", arXiv:1805.09461 v4 [cs.LG] Apr. 15, 2019, pp. 1-22.

Anonymous, "Recognizing Semantic Formatting Information in a Document", An IP.com Prior Art Database Technical Disclosure, Dec. 2017, pp. 1-35.

Anonymous, "Stylizing Map Based on Examples of Representative Styling", An IP.com Prior Art Database Technical Disclosure, Dec. 2017, pp. 1-38.

Anonymous, "Weighting Knowledge Sources to Facilitate User Input", An IP.com Prior Art Database Technical Disclosure, Jan. 2018, pp. 1-39.

* cited by examiner

TEXT STYLE TRANSFER USING REINFORCEMENT LEARNING

STATEMENT REGARDING PRIOR DISCLOSURES BY THE INVENTOR OR A JOINT INVENTOR

The following disclosure(s) are submitted under 35 U.S.C. § 102(b)(1)(A): DISCLOSURE(S): The paper "Reinforcement Learning Based Text Style Transfer without Parallel Training Corpus" authored by Hongyu Gong, Suma Bhat, Lingfei Wu, Jinjun Xiong, and Wen-mei Hwu was first released as arXiv preprint arXiv:1903.10671 on Mar. 26, 2019. It was then published in Proceedings of the 2019 Conference of the North American Chapter of the Association for Computational Linguistics: Human Language Technologies 2019 Jun. (pp. 3168-3180).

BACKGROUND

The present invention generally relates to artificial intelligence, and more particularly to a text style transfer using Reinforcement Learning (RL) without a parallel training corpus. Often it desirable to transform a source-style natural language sentence into a target-style natural language sentence while maintaining a (pre-known, that is, intended) style of the target-style natural language sentence. However, one challenge to transformation is a lack of availability of a parallel training corpus, which is typically unavailable or expensive to collect.

SUMMARY

According to aspects of the present invention, a computer-implemented method is provided for transferring a target text style using Reinforcement Learning (RL). The method includes pre-determining, by a Long Short-Term Memory (LSTM) Neural Network (NN), the target text style of a target-style natural language sentence. The method further includes transforming, by a hardware processor using the LSTM NN, a source-style natural language sentence into the target-style natural language sentence that maintains the target text style of the target-style natural language sentence. The method also includes calculating an accuracy rating of a transformation of the source-style natural language sentence into the target-style natural language sentence based upon rewards relating to at least the target text style of the source-style natural language sentence.

According to other aspects of the present invention, a computer program product is provided for transferring a target text style using Reinforcement Learning (RL). The computer program product includes a non-transitory computer readable storage medium having program instructions embodied therewith. The program instructions are executable by a computer to cause the computer to perform a method. The method includes pre-determining, by a Long Short-Term Memory (LSTM) Neural Network (NN), the target text style of a target-style natural language sentence. The method further includes transforming, by the LSTM NN, a source-style natural language sentence into the target-style natural language sentence that maintains the target text style of the target-style natural language sentence. The method also includes calculating an accuracy rating of a transformation of the source-style natural language sentence into the target-style natural language sentence based upon rewards relating to at least the target text style of the source-style natural language sentence.

According to yet other aspects of the present invention, a computer processing system is provided for transferring a target text style using Reinforcement Learning (RL). The computer processing system includes a memory device including program code stored thereon. The computer processing system further includes a hardware processor, operatively coupled to the memory device, and configured to run the program code stored on the memory device to pre-determine, using a Long Short-Term Memory (LSTM) Neural Network (NN), the target text style of a target-style natural language sentence. The hardware processor is further configured to run the program code to transform, using the LSTM NN, a source-style natural language sentence into the target-style natural language sentence that maintains the target text style of the target-style natural language sentence. The hardware processor is also configured to run the program code to calculate an accuracy rating of a transformation of the source-style natural language sentence into the target-style natural language sentence based upon rewards relating to at least the target text style of the source-style natural language sentence.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to a text style transfer using Reinforcement Learning (RL) without a parallel training corpus.

Embodiments of the present invention provide content preservation, target style, and fluency in transforming a source sentence into a target sentence.

Embodiments of the present invention can be used in a myriad applications including, but not limited to, intelligent writing, responses of chatbots and dialogue systems, automatic writing adaptation for different groups of readers, intelligent stylistic text generation, and so forth. Other applications include, but are not limited to, machine-aided paraphrasing, automated essay editing, writing style imitation, content creation on social platforms, cyberspace purification by rewriting offensive texts and so forth.

Embodiments of the present invention dispense with the requirement of parallel data. Instead, embodiments of the present invention use multiple pre-trained evaluators, e.g., style, semantic, and fluency evaluators, to evaluate the quality of outputs from a text style transfer model.

One or more embodiments of the present invention apply a policy gradient algorithm to update model parameters, and use the techniques of exploration and exploitation to enhance the performance of the reinforcement learning.

As used herein, "target text style" refers to a textual style of a target(-style) natural language sentence to be generated. Such style can include aspects such as sentiment, formality, textual simplicity, and so forth. Exemplary target text styles can include, but are not limited to, positive and negative style, formal and informal style, professional and simplified style, and so forth. For completeness, exemplary target text styles can include, but are not limited to, academic style, newspaper style, writing styles of different authors and so forth. A "target-style natural language sentence" is a natural language sentence in a target text style, while a "source-style natural language sentence" is a natural language sentence in a source text style.

Figure 1:
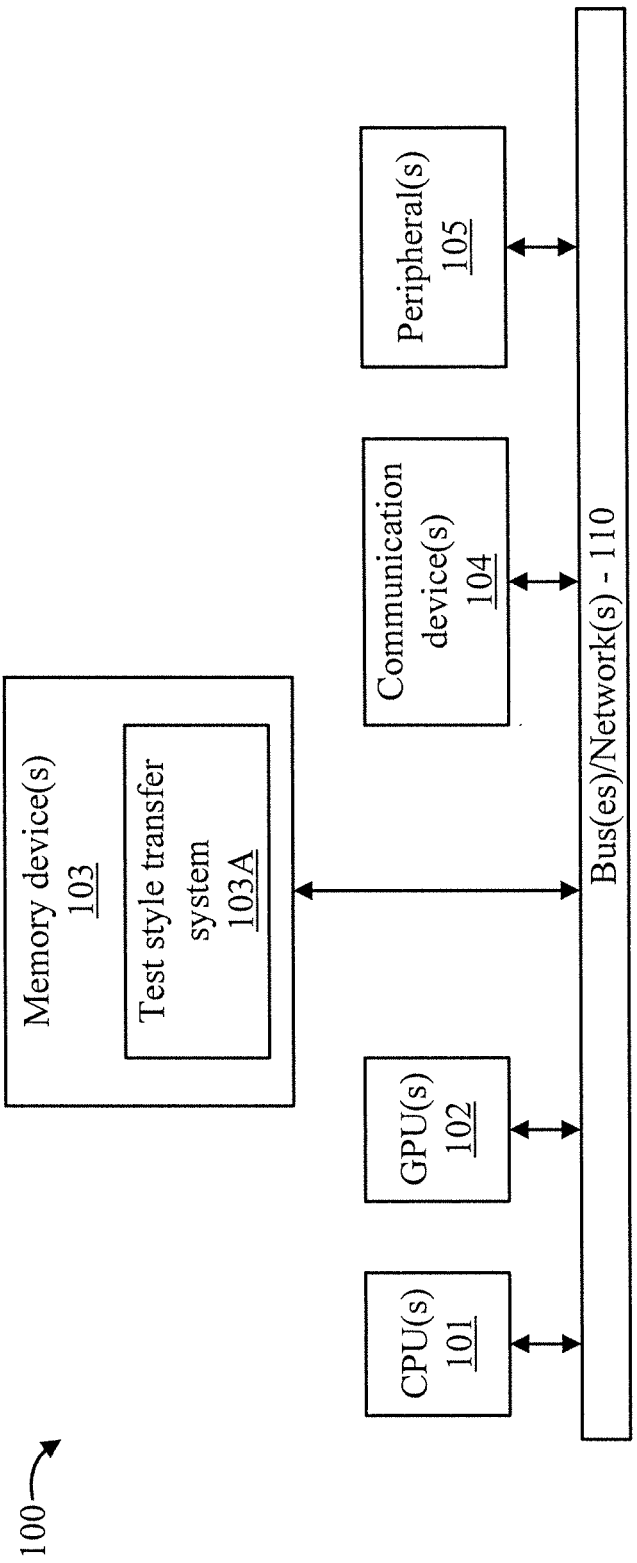
FIG. 1 is a block diagram showing an exemplary processing system, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. In one or more embodiments, the memory devices 103 include a special purpose text style transfer algorithm 103A.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 2:
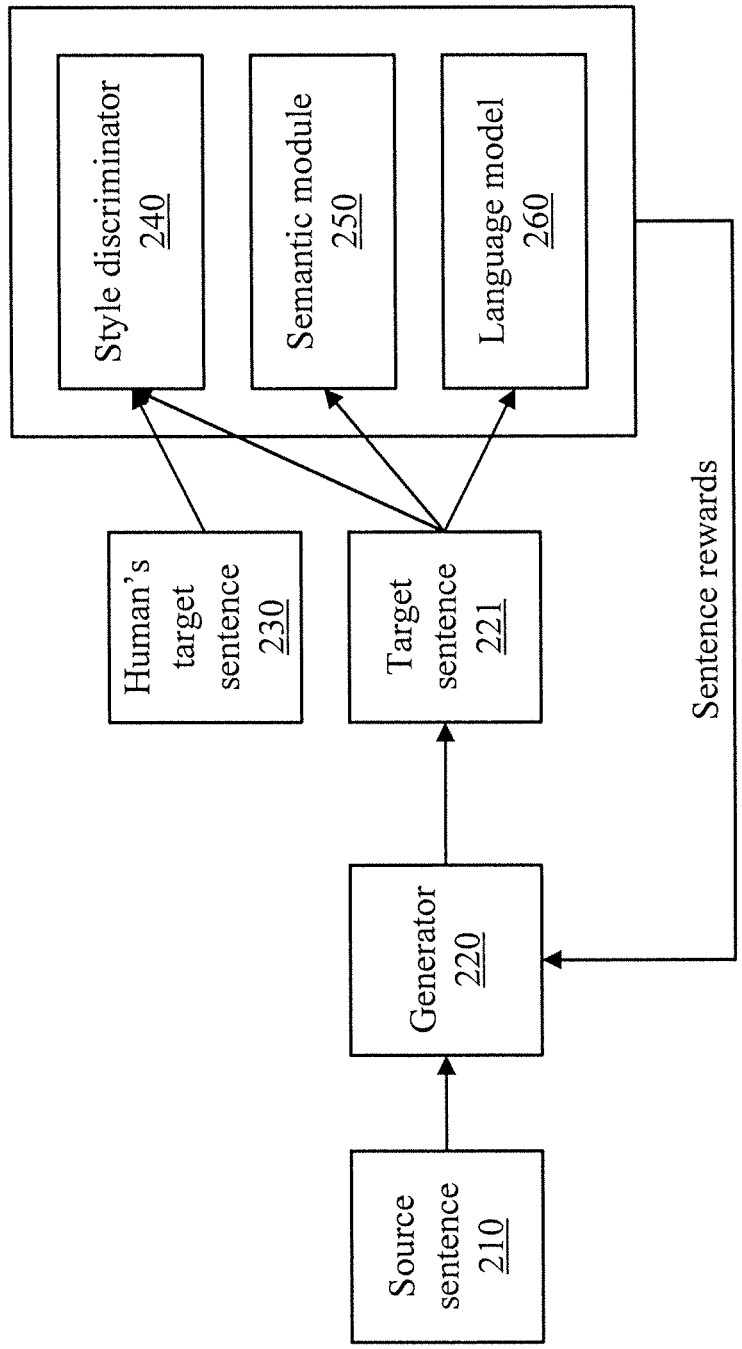
FIG. 2 is a block diagram showing an exemplary text style transfer system, in accordance with an embodiment of the present invention.

FIG. 2 is a block diagram showing an exemplary text style transfer system 200, in accordance with an embodiment of the present invention.

The text style transfer system 200 involves a source sentence 210, a target sentence generator (hereinafter interchangeably referred to as "generator") 220, a machine generated target sentence (hereinafter "target sentence") 221, a human's target sentence 230, a style discriminator 240, a semantic module 250, a language model 260, and sentence rewards 270. The human's target sentence is used for training evaluators 290. The style discriminator 240, the semantic module 250, and the language model 260 form the training evaluators 290.

A significant feature of the present invention is the generator-evaluator model that is used and formed from the combination of the generator 220 and the evaluators 290.

Regarding the target sentence generator 220, the same transforms the source sentence 210 into the target sentence 221, and receives feedback from evaluators to improve its target text generation.

Regarding the evaluators, namely the style discriminator 240, the semantic module 250, and the language model 260, the same provide feedback on the quality of the generated sentences from multiple aspects including style, semantics, and fluency, respectively.

Figure 3:
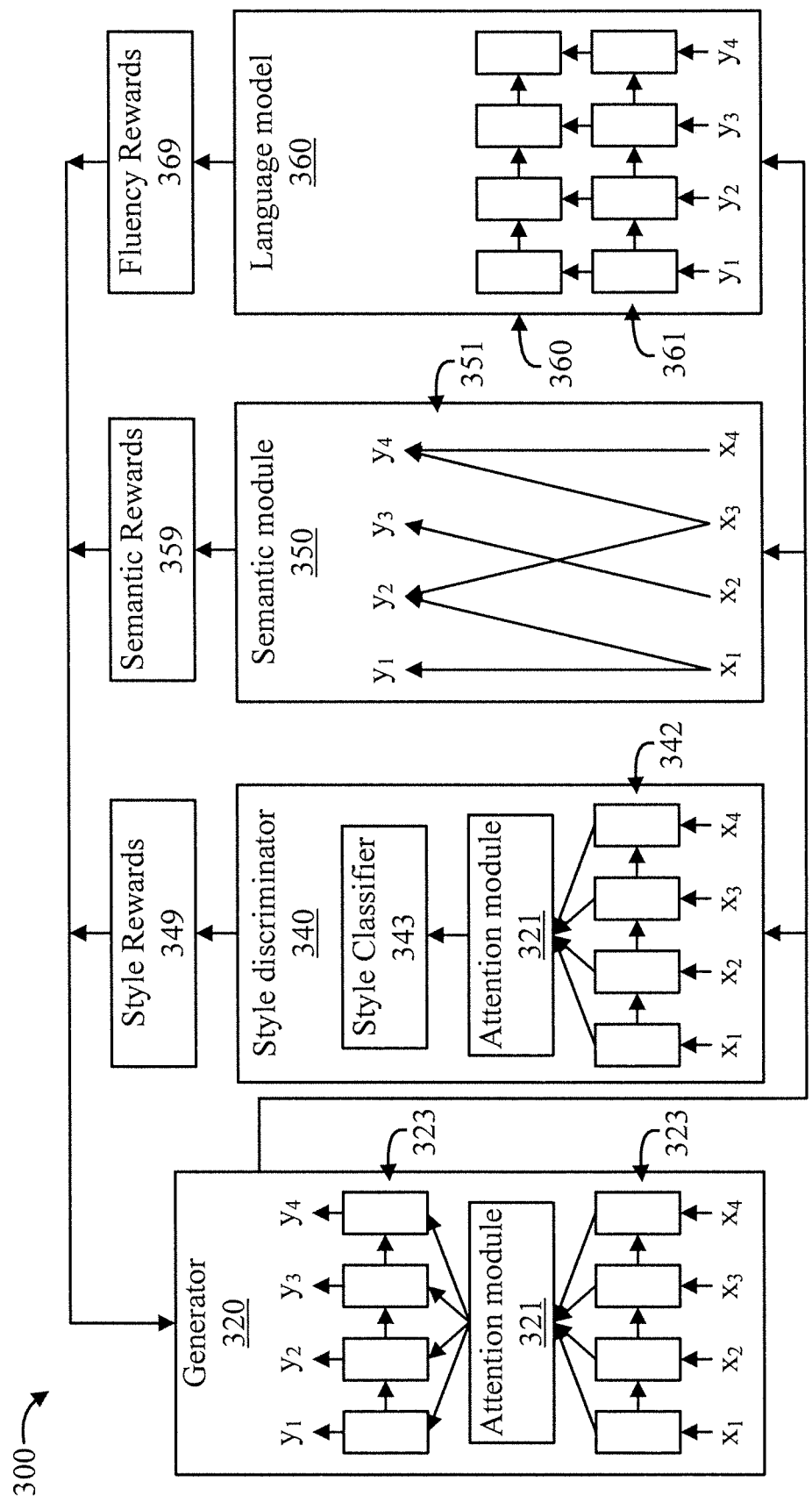
FIG. 3 is a block diagram showing an exemplary neural network architecture, in accordance with an embodiment of the present invention.

FIG. 3 is a block diagram showing an exemplary neural network architecture 300, in accordance with an embodiment of the present invention.

The neural network architecture 300 includes a target-style natural language sentence generator (hereinafter interchangeably referred to as "generator") 320, a style discriminator 340, a semantic module 350, and a language model 360. The style discriminator 340, the semantic module 350, and the language model 360 can be considered collectively and individually as evaluators 390.

Regarding the generator 320, the same is a model formed from a sequence-to-sequence Recurrent (e.g., Long Short-Term Memory (LSTM)) Neural Network (RNN) with an attention module 321. The generator 320 includes an RNN-based encoder which processes a source sentence 322 and an RNN-based decoder which generates a target sentence 323 with the attention module 321 implemented by one or more hidden layers. The input to the generator 320 is a source sentence $x_i$. The output from the generator 320 is a target sentence $y_i$. Regarding the attention module 321, the same is configured to output an attention over all tokens in the input source sentence.

In an embodiment, the generator 320 includes an encoder 326 and a decoder 327. The encoder 326 processes the input source-style natural language sentences to generate sentence representations. The decoder 327 takes the input representation from the encoder to output the target-style natural language sentences.

A reinforcement learning agent, here the generator 320, interacts with its environment in discrete time steps. At each time step t, the agent receives an observation $o_t$, which typically includes the reward $Q_t$ or, in this case, 3 rewards $Q_{t1}$, $Q_{t2}$, $Q_{t3}$. The agent then chooses a word $w_t$ from the set of available words, which is subsequently sent to the environment. The environment moves to a new state $s_{t+1}$ and the reward $Q_{t+1}$ (that is, rewards $Q_{t1+1}$, $Q_{t2+1}$, $Q_{t3+1}$) associated with the transition ($s_t$, $w_t$, $s_{t+1}$) is (are) determined. The goal of a reinforcement agent is to collect as much reward as possible, thus maximizing the 3 features of target style, semantic meaning (source content preservation), and language fluency for a given word selection/replacement. Different weightings can be used for each of the features, depending upon a respective importance of each to a given result or based on some other criteria.

Regarding the style discriminator 340, the same is configured to output style rewards 349. The style discriminator 340 is implemented as a style classifier built 343 upon a bidirectional RNN 342 with an attention module 341. The style discriminator 340 is pre-trained on a source corpus and a target corpus in style classification. The style discriminator 340 is adversarially trained on target sentences generated by the generator 320. In an embodiment, the style discriminator 340 is configured to guarantee a style transfer strength of the transformation above a threshold amount, where the style of the target sentence is maintained in the transformation thus preserving the target sentence style. Regarding the attention module 341, the same is configured to output the attention vector over all token in the input source sentence.

Regarding the semantic module 350, the same is configured to output semantic regards 359. The semantic module 350 uses Word Mover's Distance (WMD). WMD suggests that distances between embedded word vectors are to some degree semantically meaningful. WMD utilizes this property of word vector embeddings and treats text documents as a weighted point cloud or other distribution of embedded words. To that end, the WMD involves an embedding-based similarity metric for sentence pairs, word alignment between two sentences, and sentence distance calculation as a sum of distances between words. In an embodiment, the semantic module 350 is configured to guarantee a source content preservation between the source-style natural language sentence and the target-style natural language sentence. In an embodiment, the semantic module 350 employs a mapping 351 between tokens in an input source sentence and an output target sentence.

Regarding the language model 360, the same is configured to output fluency rewards 369. The language model 360 is implemented as a RNN-based language model and includes an RNN-based sentence encoder 361 and an RNN-based sentence decoder 362. The language model 360 predicts the probability of the next token given previous tokes in the input sentence. The language model 360 provides an efficient measure of sentence fluency. In an embodiment, the language model 360 is configured to guarantee a fluency of the target-style natural language sentence.

The evaluators 390 put necessary constraints on generated sentences, but the evaluators 390 introduce non-differentiable training objectives including style rewards, semantic rewards and language fluency rewards assigned to sentences. Accordingly, a reinforcement learning framework allow for a general training objectives as follows:

State: source sentence and tokens already generated in the target sentence

Action: the next token is generated

Reward: how good an action is

Policy: Prediction of the next token, i.e., the probability over the whole vocabulary.

Figure 4:
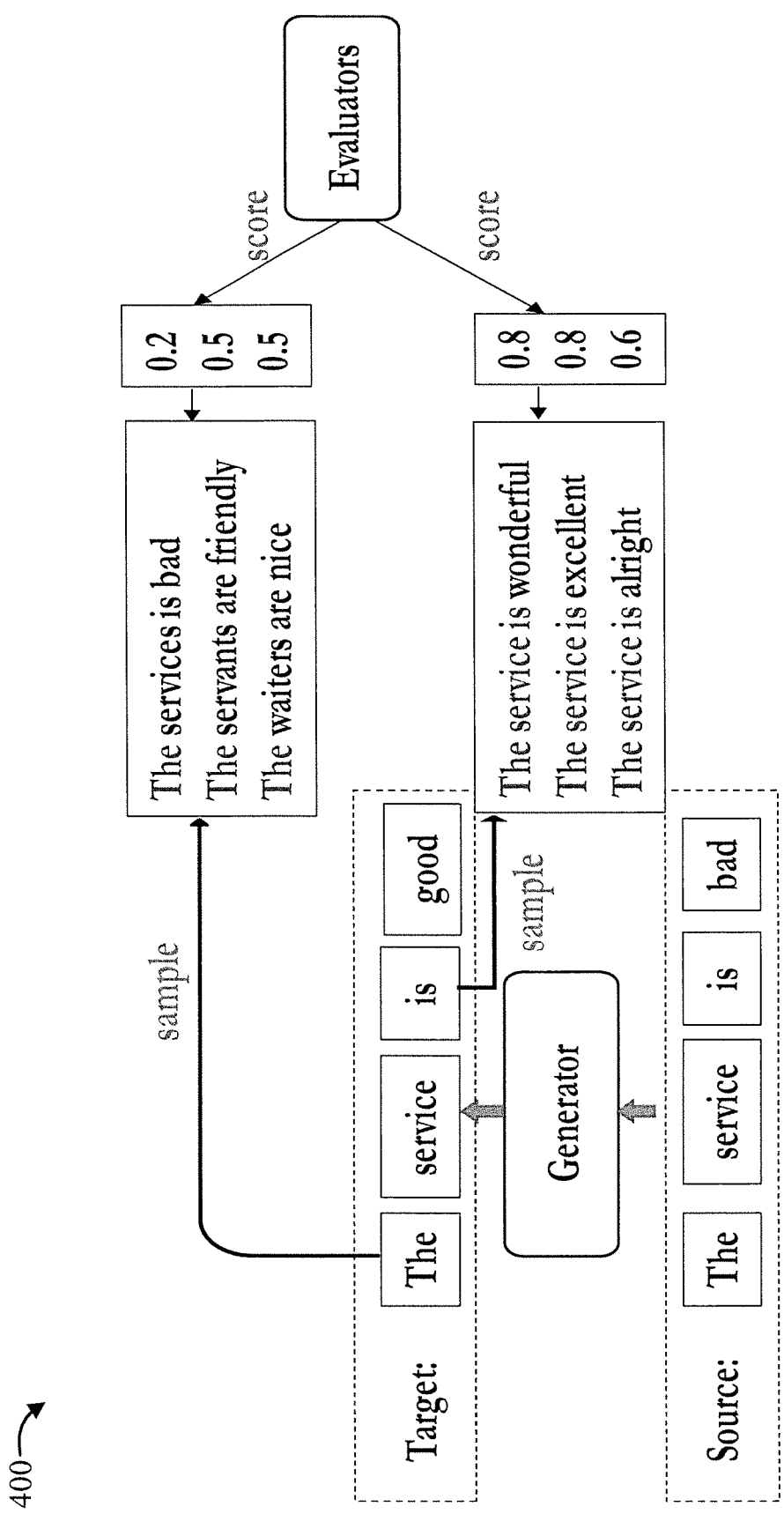
FIG. 4 is a block diagram showing an exemplary reward estimation, in accordance with an embodiment of the present invention.

FIG. 4 is a block diagram showing an exemplary reward estimation 400, in accordance with an embodiment of the present invention. Given a source sentence of "The service is bad", the generator transforms the source sentence into the target sentence of "The service is good". In the example of FIG. 4, the evaluators are shown applied to the first and third words, namely "The" and "is".

Candidate target sentences relating to the first word include the following: "The service is bad"; "The servants are friendly"; and "The waiters are nice", with respective reward scores of 0.2, 0.5, and 0.5.

Candidate target sentences relating to the third word include the following: "The service is wonderful", "The service is excellent", and "The service is alright", with respective reward scores of 0.8, 0.8, and 0.6.

A description will now be given regarding model training, in accordance with an embodiment of the present invention.

Regarding model training, the following applies:

State $s_t$

Token $y_t$

Reward $Q(y_t|s_t)$: the reward of evaluators for each token $y_t$ given its state $s_t$ Probability $p(y_t|s_t)$: estimated word probability by the generator Model training is performed to maximize the expected reward J as follows:

$$J = \Sigma_{t=1}^{T} \Sigma_{y_t} p(y_t|s_t) \cdot Q(y_t|s_t).$$

Policy gradient: the REINFORCE algorithm, which is a Policy Gradient method used in RL that iteratively updates agent's parameters by computing policy gradient.

Figure 5:
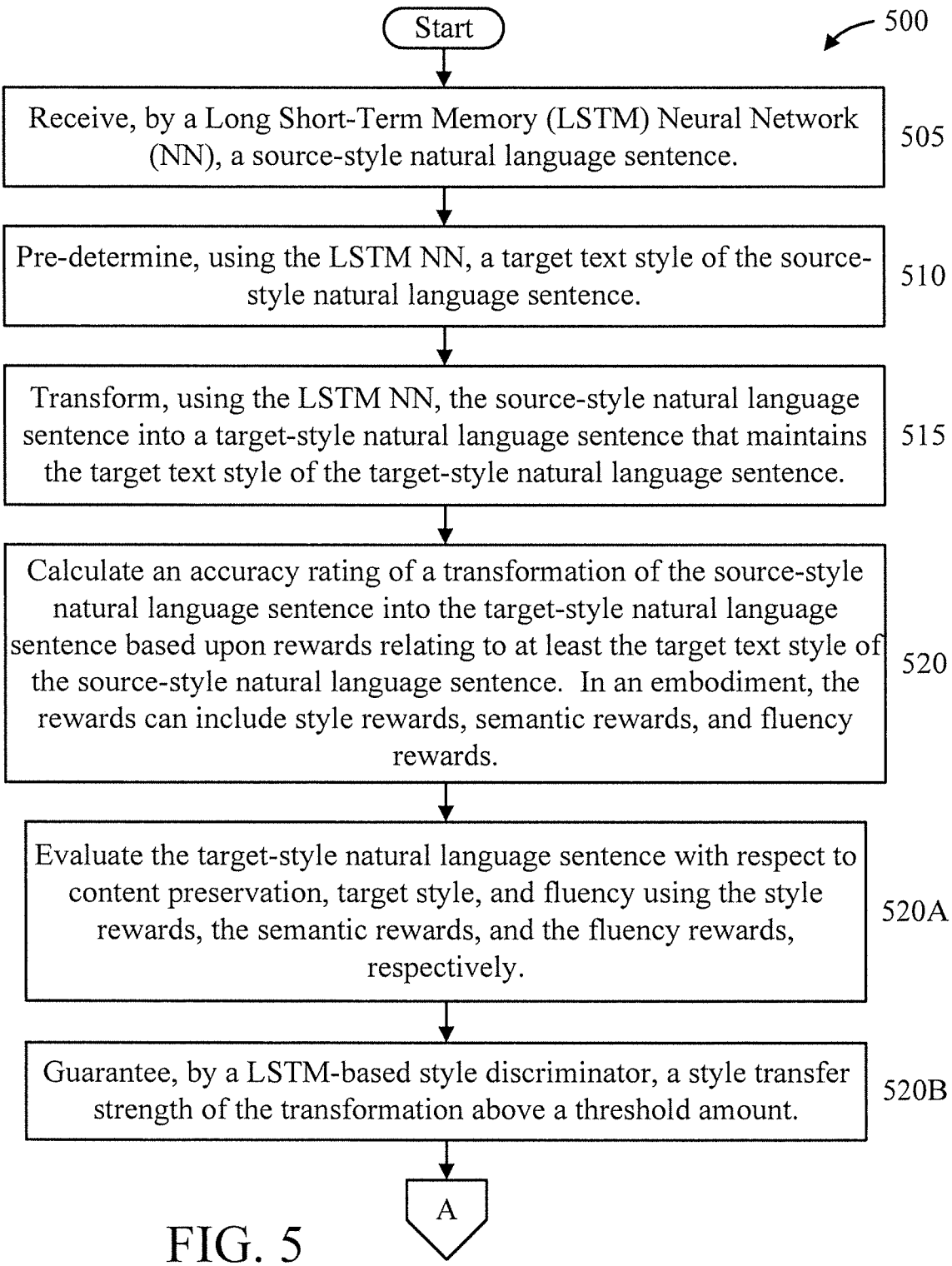
FIGS. 5-6 are flow diagrams showing an exemplary method for text style transfer using Reinforcement Learning (RL), in accordance with an embodiment of the present invention.
Figure 6:
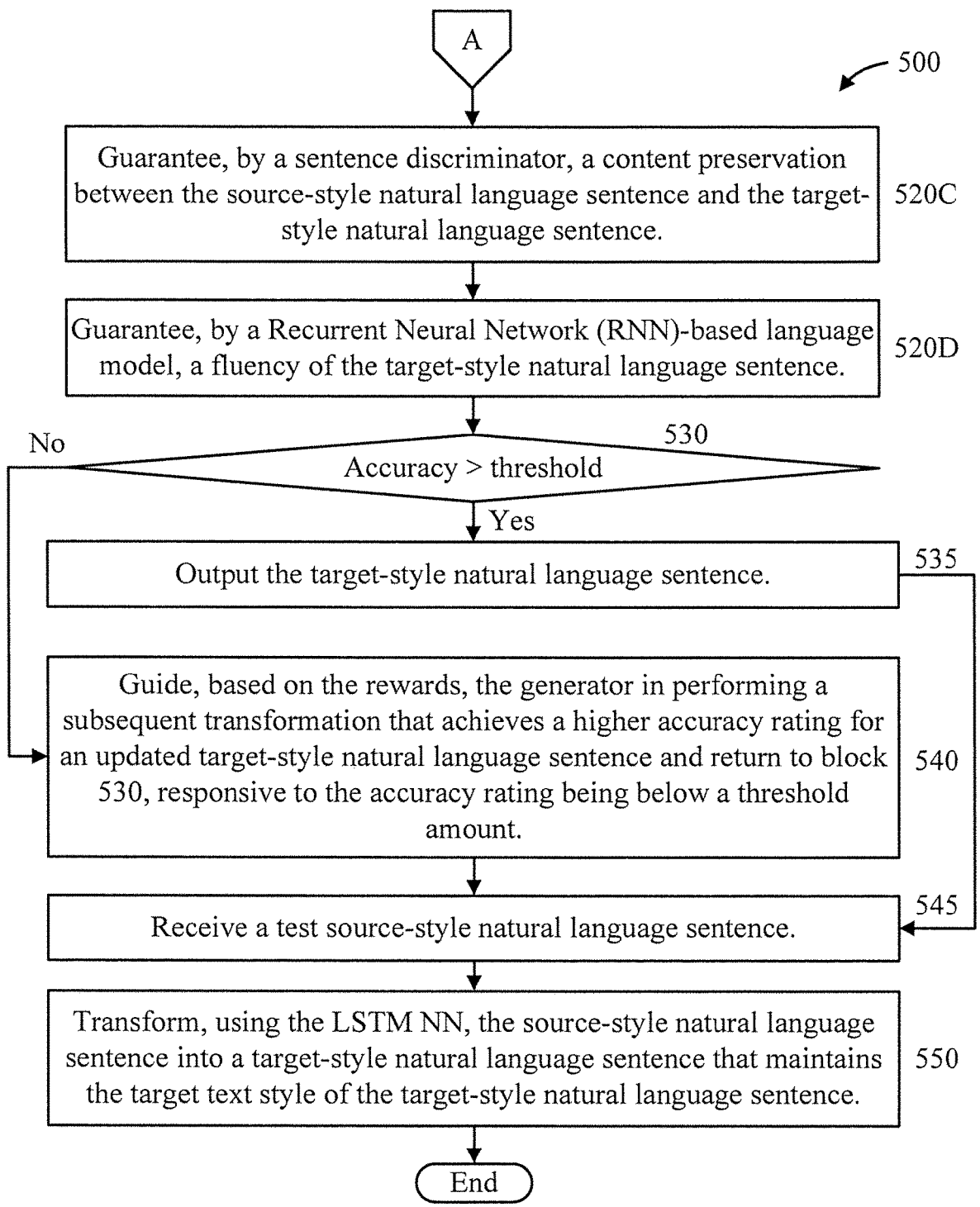

FIGS. 5-6 are flow diagrams showing an exemplary method 500 for text style transfer using Reinforcement Learning (RL), in accordance with an embodiment of the present invention. In an embodiment, blocks 505 through 540 pertain to a training phase of method 500, while blocks 545 through 550 pertain to a testing phase of method 500.

At block 505, receive, by a Long Short-Term Memory (LSTM) Neural Network (NN), a source-style natural language sentence.

At block 510, pre-determine, using the LSTM NN, a target text style of the source-style natural language sentence. This block can be performed by retrieving an intended target style and corresponding rewards to be used for evaluation of a generated sentence in blocks 520 and 540.

At block 515, transform, using the LSTM NN, the source-style natural language sentence into a target-style natural language sentence that maintains the target text style of the target-style natural language sentence.

At block 520, calculate an accuracy rating of a transformation of the source-style natural language sentence into the target-style natural language sentence based upon rewards relating to at least the target text style of the source-style natural language sentence. In an embodiment, the rewards can include style rewards, semantic rewards, and fluency rewards.

In an embodiment, block 520 can include one or more of blocks 520A through 520D.

At block 520A, evaluate the target-style natural language sentence with respect to content preservation, target style, and fluency using the style rewards, the semantic rewards, and the fluency rewards, respectively.

At 520B, guarantee, by a LSTM-based style discriminator, a style transfer strength of the transformation above a threshold amount.

At block 520C, guarantee, by a sentence discriminator, a content preservation between the source-style natural language sentence and the target-style natural language sentence.

At block 520D, guarantee, by a Recurrent Neural Network (RNN)-based language model, a fluency of the target-style natural language sentence.

At block 530, determine if the accuracy rating is above a threshold. If so, then proceed to block 535. Otherwise, proceed to block 540.

At block 535, output the target-style natural language sentence.

At block 540, guide, based on the rewards, the generator in performing a subsequent transformation that achieves a higher accuracy rating for an updated target-style natural language sentence and return to block 530, responsive to the accuracy rating being below a threshold amount. In an embodiment, block 520 is also performed with the generator guided by the rewards.

At block 545, receive a test source-style natural language sentence.

At block 550, transform, using the LSTM NN, the source-style natural language sentence into a target-style natural language sentence that maintains the target text style of the target-style natural language sentence.

Figure 7:
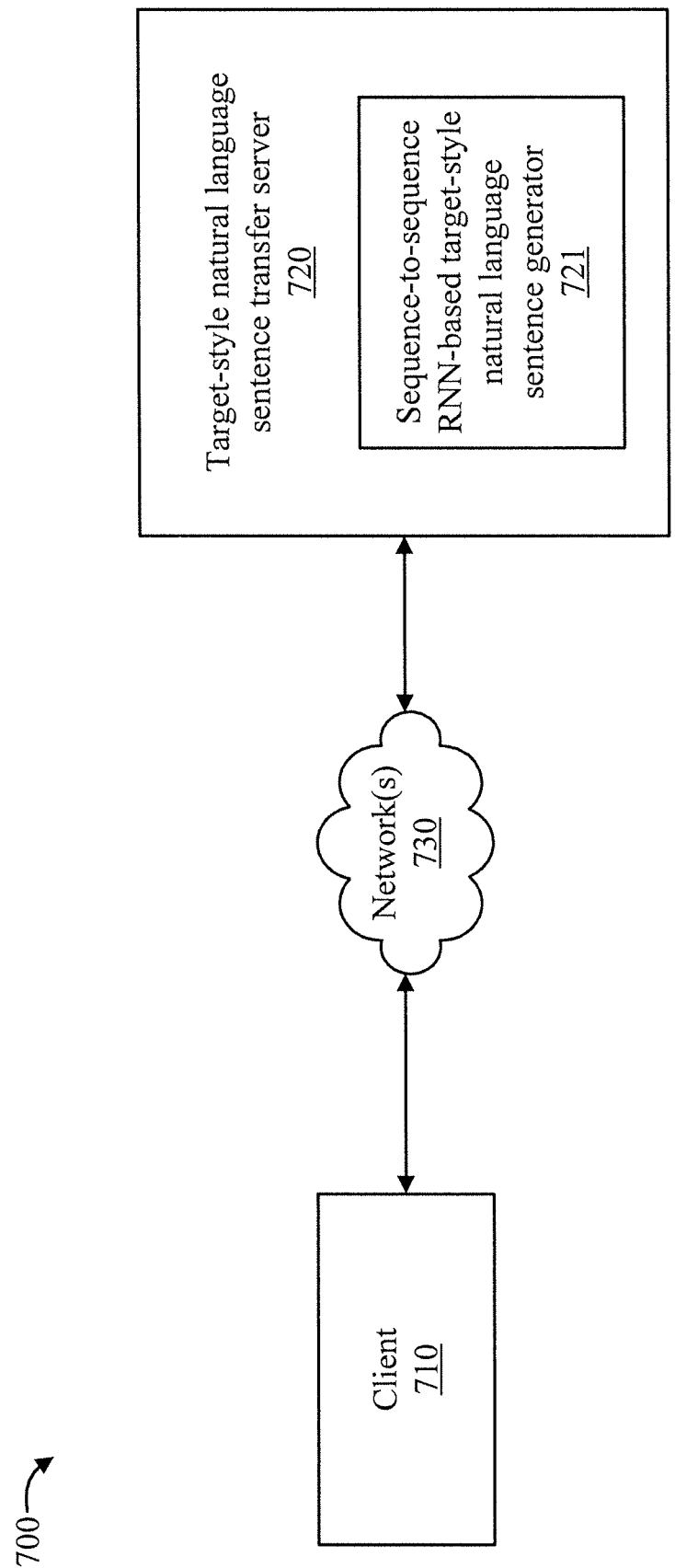
FIG. 7 is a diagram showing an exemplary environment, in accordance with an embodiment of the present invention.

FIG. 7 is a diagram showing an exemplary environment 700, in accordance with an embodiment of the present invention.

The environment 700 includes a client device (hereinafter interchangeably referred to as "client") 710 and a target style natural language sentence transfer server (hereinafter interchangeably referred to as "server") 720. While one of each is shown for the sake of brevity, in other embodiment more than one of the preceding elements can be included in an environment in accordance with the present invention. The client 710 interfaces with the server 720 over one or more networks 730 to provide source-style natural language sentences and receive, in return, target-style natural language sentences that preserve the style of the source-style natural language sentences. In an embodiment, the corresponding source-style natural language sentence may also be included in the output from the server 720 together with target-style natural language sentence to provide a complete set of information for a given source-style natural language sentence. Transformation of the source-style natural language sentence into the target-style natural language sentence is performed using a sequence-to-sequence Recurrent Neural Network (RNN)-based target-style natural language sentence generator 721 with an attention mechanism/module. One or more embodiments of the present invention can involve the server being part of a system such as, for example, but not limited to, an intelligent writing system, a chatbot response system, a dialogue system, an automatic writing adaptation system, and intelligent stylistic text generation system, and so forth, as readily appreciated by one of ordinary skill in the art given the teachings of the present invention provided herein.

It is to be appreciated that the present invention can be applied to a myriad of applications as readily appreciated given the teachings of the present invention provided herein.

For example, embodiments of the present invention can be directed to intelligent writing. Such intelligent writing can be used with respect to, for example, but not limited to, personalized responses of chatbots and dialogue systems, automatic writing adaptation for different groups of readers, intelligent stylistic text generation, and so forth. Other applications include, but are not limited to, machine-aided paraphrasing, automated essay editing, writing style imitation, content creation on social platforms, cyberspace purification by rewriting offensive texts and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
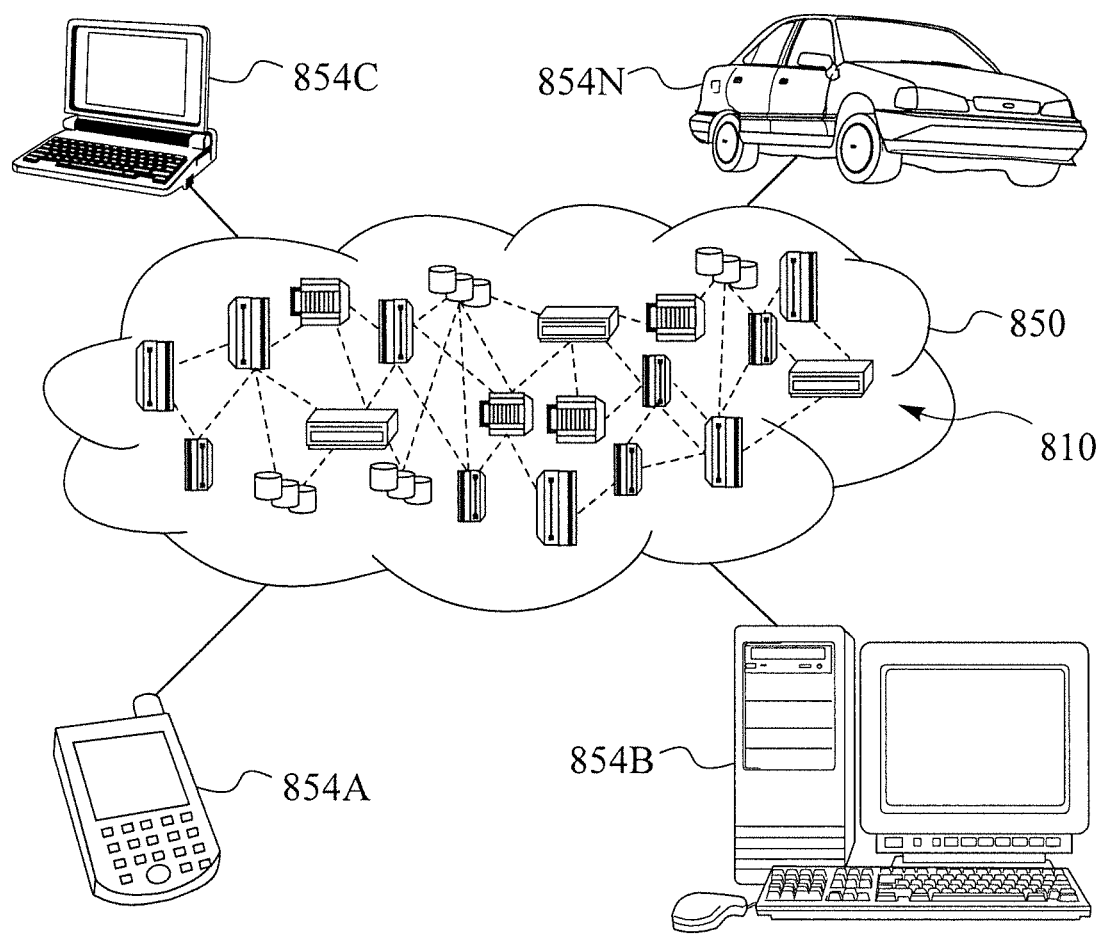
FIG. 8 is a block diagram showing an illustrative cloud computing environment having one or more cloud computing nodes with which local computing devices used by cloud consumers communicate, in accordance with an embodiment of the present invention.
Figure 9:
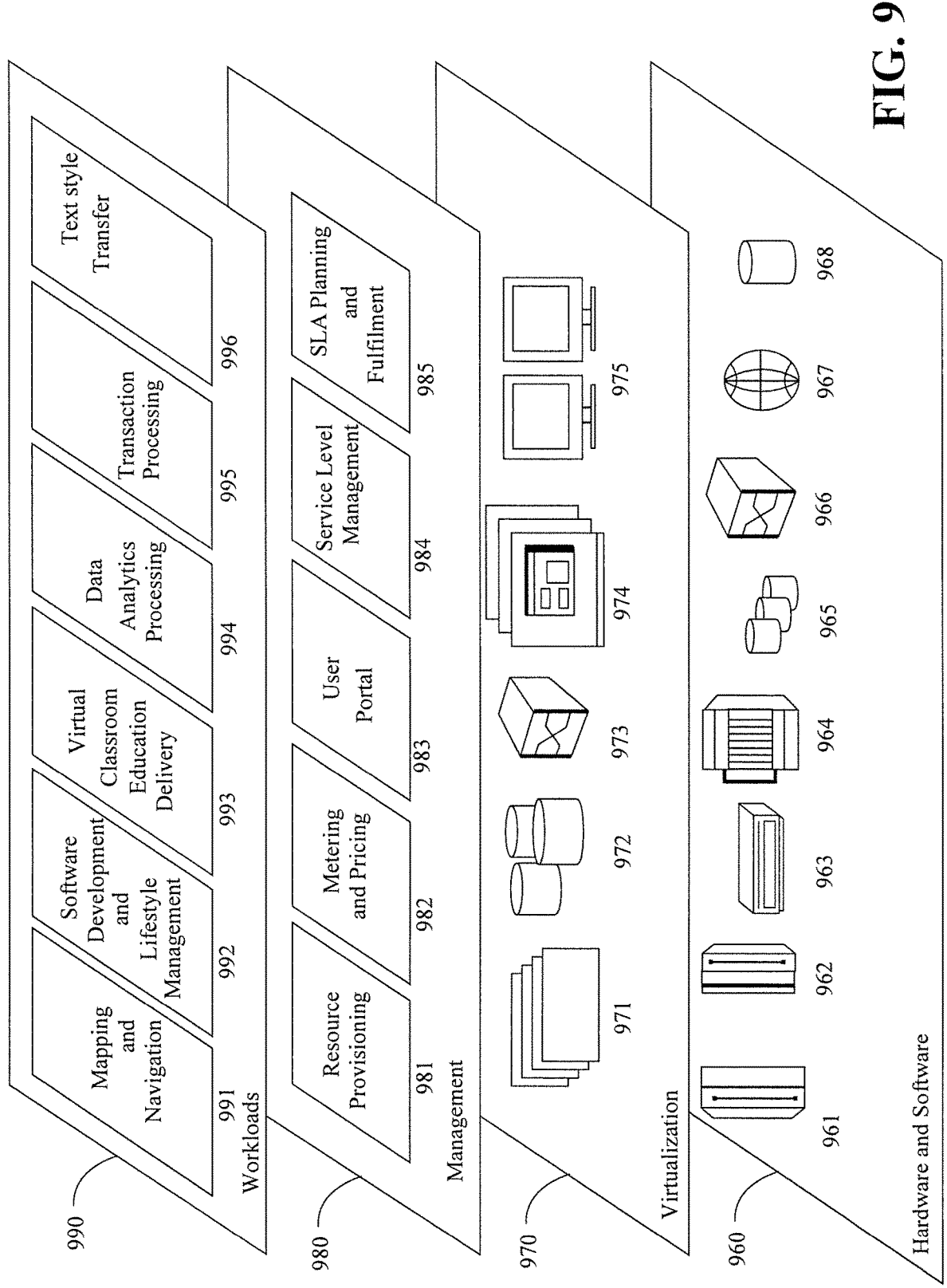
FIG. 9 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below.

Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized.

Examples of workloads and functions which may be provided from this layer include: mapping and navigation 891; software development and lifecycle management 892; virtual classroom education delivery 893; data analytics processing 894; transaction processing 895; and text style transfer 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for transferring a target text style using Reinforcement Learning (RL), comprising:
   pre-determining, by a Long Short-Term Memory (LSTM) Neural Network (NN), the target text style of a target-style natural language sentence;
   transforming, by a hardware processor using the LSTM NN, a source-style natural language sentence into the target-style natural language sentence that maintains the target text style of the target-style natural language sentence; and
   calculating an accuracy rating of a transformation of the source-style natural language sentence into the target-style natural language sentence based upon rewards relating to at least the target text style of the source-style natural language sentence,
   wherein the rewards comprise style rewards which are determined using a style classifier built upon a bidirectional recurrent neural network with an attention mechanism.

2. The computer-implemented method of claim 1, wherein the rewards further comprise, semantic rewards and fluency rewards, and wherein said calculating step comprises evaluating the target-style natural language sentence with respect to content preservation, target text style, and fluency using the style rewards, the semantic rewards, and the fluency rewards, respectively.

3. The computer-implemented method of claim 2, wherein the semantic rewards are determining using a semantic module configured to determine a Word Mover's Distance (WMD) as an embedding-based similarity metric calculated as a sum of distances between co-occurring words in the source-style natural language sentence relative to the target-style natural language sentence.

4. The computer-implemented method of claim 2, wherein the fluency rewards are determined using a Recurrent Neural Network (RNN)-based language model.

5. The computer-implemented method of claim 1, wherein the style classifier is pre-trained on a source and target corpus in style classification.

6. The computer-implemented method of claim 1, wherein the style classifier is adversarially trained on target-style natural language sentences generated by said transforming step.

7. The computer-implemented method of claim 1, further comprising guaranteeing, by a LSTM-based style discriminator, a style transfer strength of the transformation above a threshold amount.

8. The computer-implemented method of claim 1, further comprising guaranteeing, by a sentence discriminator, a content preservation between the source-style natural language sentence and the target-style natural language sentence.

9. The computer-implemented method of claim 1, further comprising guaranteeing, by a Recurrent Neural Network (RNN)-based language model, a fluency of the target-style natural language sentence.

10. The computer-implemented method of claim 1, guiding, based on the rewards, the generator in performing a subsequent transformation that achieves a higher accuracy rating, responsive to the accuracy rating being below a threshold amount.

11. The computer-implemented method of claim 1, repeating said guiding step until the accuracy rating is equal to or greater than the threshold amount.

12. A computer program product for transferring a target text style using Reinforcement Learning (RL), the computer program product comprising a non-transitory computer readable storage medium having program instructions embodied therewith, the program instructions executable by a computer to cause the computer to perform a method comprising:
   pre-determining, by a Long Short-Term Memory (LSTM) Neural Network (NN), the target text style of a target-style natural language sentence;
   transforming, by the LSTM NN, a source-style natural language sentence into the target-style natural language sentence that maintains the target text style of the target-style natural language sentence; and
   calculating an accuracy rating of a transformation of the source-style natural language sentence into the target-style natural language sentence based upon rewards relating to at least the target text style of the source-style natural language sentence,
   wherein the rewards comprise style rewards which are determined using a style classifier built upon a bidirectional recurrent neural network with an attention mechanism.

13. The computer program product of claim 12, wherein the rewards further comprise semantic rewards and fluency rewards, and wherein said calculating step comprises evaluating the target-style natural language sentence with respect to content preservation, target style, and fluency using the style rewards, the semantic rewards, and the fluency rewards, respectively.

14. The computer program product of claim 12, further comprising guaranteeing, by a LSTM-based style discriminator, a style transfer strength of the transformation above a threshold amount.

15. The computer program product of claim 12, further comprising guaranteeing, by a sentence discriminator, a content preservation between the source-style natural language sentence and the target-style natural language sentence.

16. The computer program product of claim 12, further comprising guaranteeing, by a Recurrent Neural Network (RNN)-based language model, a fluency of the target-style natural language sentence.

17. The computer program product of claim 12, further comprising guiding, based on the rewards, the generator in performing a subsequent transformation that achieves a higher accuracy rating, responsive to the accuracy rating being below a threshold amount.

18. The computer program product of claim 17, further comprising repeating said guiding step until the accuracy rating is equal to or greater than the threshold amount.

19. A computer processing system for transferring a target text style using Reinforcement Learning (RL), comprising:
a memory device including program code stored thereon;
a hardware processor, operatively coupled to the memory device, and configured to run the program code stored on the memory device to
pre-determine, using a Long Short-Term Memory (LSTM) Neural Network (NN), the target text style of a target-style natural language sentence;
transform, using the LSTM NN, a source-style natural language sentence into the target-style natural language sentence that maintains the target text style of the target-style natural language sentence; and
calculate an accuracy rating of a transformation of the source-style natural language sentence into the target-style natural language sentence based upon rewards relating to at least the target text style of the source-style natural language sentence,
wherein the rewards comprise style rewards which are determined using a style classifier built upon a bidirectional recurrent neural network with an attention mechanism.

* * * * *